US012548521B2

(12) United States Patent
Chen et al.

(10) Patent No.: US 12,548,521 B2
(45) Date of Patent: Feb. 10, 2026

(54) DISPLAY SUBSTRATE AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Jiaxing Chen, Beijing (CN); Yi Zhang, Beijing (CN); Tinghua Shang, Beijing (CN); Qian Xu, Beijing (CN); Biao Liu, Beijing (CN); Zuoji Niu, Beijing (CN); Yan Huang, Beijing (CN); Yuge Chu, Beijing (CN); Yixuan Long, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 80 days.

(21) Appl. No.: 18/564,251

(22) PCT Filed: Dec. 21, 2022

(86) PCT No.: PCT/CN2022/140721
§ 371 (c)(1),
(2) Date: Nov. 27, 2023

(87) PCT Pub. No.: WO2024/130594
PCT Pub. Date: Jun. 27, 2024

(65) Prior Publication Data
US 2025/0078766 A1 Mar. 6, 2025

(51) Int. Cl.
*G09G 3/3266* (2016.01)

(52) U.S. Cl.
CPC ... *G09G 3/3266* (2013.01); *G09G 2300/0408* (2013.01); *G09G 2300/0426* (2013.01);
(Continued)

(58) Field of Classification Search
CPC .................. G09G 3/20; G09G 3/3266; G09G 2300/0408; G09G 2300/0426;
(Continued)

(56) References Cited

U.S. PATENT DOCUMENTS

2018/0190190 A1* 7/2018 Xi ........................ G09G 3/3208
2019/0096978 A1* 3/2019 Jung .................... G09G 3/3275
(Continued)

FOREIGN PATENT DOCUMENTS

CN 108469706 A 8/2018
CN 113906568 A 1/2022
(Continued)

OTHER PUBLICATIONS

International Search Report in PCT/CN2022/140721 in Chinese dated Aug. 30, 2023.
(Continued)

*Primary Examiner* — Amr A Awad
*Assistant Examiner* — Aaron Midkiff
(74) *Attorney, Agent, or Firm* — Collard & Roe, P.C.

(57) ABSTRACT

A display substrate and a display device. In the display substrate, a plurality of first output ends of the plurality of straight edge gate driving structures are connected to the plurality of first signal lines through a plurality of first connection structures, and a plurality of second output ends of the plurality of rounded corner gate driving structures are connected to the plurality of second signal lines through a plurality of second connection structures; the first conductive part and the second conductive part are located in a same conductive layer, and a number and a type of the plurality of via connection structures in each of the plurality of first connection structures are the same as a number and a type of the plurality of via connection structures in each of the plurality of second connection structures.

18 Claims, 4 Drawing Sheets

(52) U.S. Cl.
CPC ............... *G09G 2310/0281* (2013.01); *G09G 2320/0223* (2013.01)

(58) Field of Classification Search
CPC ... G09G 2310/0281; G09G 2320/0223; G09G 3/3674; G09G 3/3677; G09G 2310/0267; G09G 2300/0413; G09G 2310/0286; G11C 19/28–287; H10K 59/10
See application file for complete search history.

(56) References Cited

U.S. PATENT DOCUMENTS

| | | | | |
|---|---|---|---|---|
| 2020/0064700 | A1* | 2/2020 | Cheng | H10D 86/441 |
| 2022/0122547 | A1 | 4/2022 | Yu | |
| 2022/0293714 | A1* | 9/2022 | Gunji | G09F 9/30 |
| 2023/0030745 | A1 | 2/2023 | Sun et al. | |
| 2024/0021626 | A1 | 1/2024 | Wang et al. | |

FOREIGN PATENT DOCUMENTS

| | | | |
|---|---|---|---|
| CN | 114388558 | A | 4/2022 |
| CN | 115280504 | A | 11/2022 |

OTHER PUBLICATIONS

Written Opinion of the International Searching Authority in PCT/CN2022/140721 in Chinese dated Aug. 30, 2023.

* cited by examiner

DISPLAY SUBSTRATE AND DISPLAY DEVICE

CROSS REFERENCE TO RELATED APPLICATIONS

This application is the National Stage of PCT/CN2022/140721 filed on Dec. 21, 2022, the disclosure of which is incorporated by reference.

TECHNICAL FIELD

Embodiments of the present disclosure relate to a display substrate and a display device.

BACKGROUND

With the continuous development of display technology, organic light emitting diode display devices (OLEDs) have become a research hotspot and a technological development direction for the current manufacturers due to their advantages such as fast response speed, wide color gamut, high contrast, lightweight design, self-illumination, and wide viewing angle. On the other hand, organic light emitting display devices do not require backlight units and can be formed on flexible substrates made of flexible materials, which can also be applied to flexible display technology.

At present, organic light emitting diode display devices (OLEDs) have been widely used in various electronic products, ranging from small electronic products such as smart bracelets, smartwatches, smartphones, tablet computers and so on to large electronic products such as laptop computers, desktop computers, televisions and so on. Therefore, the market demand for active matrix organic light-emitting diode display devices is also increasing. At the same time, the market has increasingly high requirements for the display quality of organic light-emitting diode display devices.

SUMMARY

Embodiments of the present disclosure provide a display substrate and a display device. The display substrate includes a base substrate, a plurality of first signal lines, a plurality of second signal lines, and a plurality of gate driving structures; the base substrate includes a display area and a peripheral area located around the display area; the plurality of first signal lines are located in the display area and extend in a first direction; the plurality of second signal lines are located in the display area and extend in the first direction; the plurality of gate driving structures are located in the peripheral area and arranged in a second direction intersecting with the first direction; the display area includes a straight edge region and a rounded corner region, the rounded corner region is located on a side of the straight edge region in the second direction, each of the first signal lines is at least partially located in the straight edge region, and each of the second signal lines is at least partially located in the rounded corner region; the plurality of gate driving structures include a plurality of straight edge gate driving structures and a plurality of rounded corner gate driving structures, each of the straight edge gate driving structures includes a first output end, and each of the rounded corner gate driving structures includes a second output end; a plurality of first output ends of the plurality of straight edge gate driving structures are connected to the plurality of first signal lines through a plurality of first connection structures, and a plurality of second output ends of the plurality of rounded corner gate driving structures are connected to the plurality of second signal lines through a plurality of second connection structures; each of the plurality of first connection structures includes a first conductive part and a plurality of via connection structures, each of the plurality of second connection structures includes a second conductive part and a plurality of via connection structures, the first conductive part and the second conductive part are located in a same conductive layer, and a number and a type of the plurality of via connection structures in each of the plurality of first connection structures are the same as a number and a type of the plurality of via connection structures in each of the plurality of second connection structures. Therefore, by making the number and the type of the plurality of via connection structures in each of the plurality of first connection structures the same as those in each of the plurality of second connection structures, the display substrate can effectively reduce the difference between the electrical properties of the plurality of first connection structures and the electrical properties of the plurality of second connection structures, thereby effectively reducing the risk of abnormal display on the display substrate.

At least one embodiment of the present disclosure provides a display substrate, which includes: a base substrate, including a display area and a peripheral area located around the display area; a plurality of first signal lines, located in the display area and extending in a first direction; a plurality of second signal lines, located in the display area and extending in the first direction; a plurality of gate driving structures, located in the peripheral area and arranged in a second direction intersecting with the first direction; the display area includes a straight edge region and a rounded corner region, the rounded corner region is located on a side of the straight edge region in the second direction, each of the first signal lines is at least partially located in the straight edge region, and each of the second signal lines is at least partially located in the rounded corner region; the plurality of gate driving structures include a plurality of straight edge gate driving structures and a plurality of rounded corner gate driving structures, each of the straight edge gate driving structures includes a first output end, and each of the rounded corner gate driving structures includes a second output end; a plurality of first output ends of the plurality of straight edge gate driving structures are connected to the plurality of first signal lines through a plurality of first connection structures, and a plurality of second output ends of the plurality of rounded corner gate driving structures are connected to the plurality of second signal lines through a plurality of second connection structures; each of the plurality of first connection structures includes a first conductive part and a plurality of via connection structures, each of the plurality of second connection structures includes a second conductive part and a plurality of via connection structures, the first conductive part and the second conductive part are located in a same conductive layer, and a number and a type of the plurality of via connection structures in each of the plurality of first connection structures are the same as a number and a type of the plurality of via connection structures in each of the plurality of second connection structures.

For example, in the display substrate provided by an embodiment of the present disclosure, the plurality of first signal lines and the plurality of second signal lines are configured to transmit a same type of first driving signals, and both the first output end and the second output end are configured to output the same type of first driving signals.

For example, in the display substrate provided by an embodiment of the present disclosure, the first driving signal includes one of a first gate driving signal, a second gate driving signal, and a light emission control signal.

For example, the display substrate provided by an embodiment of the present disclosure further includes: a plurality of third signal lines, located in the display area and extending in the first direction; a plurality of fourth signal lines, located in the display area and extending in the first direction; each of the plurality of third signal lines is at least partially located in the straight edge region, and each of the plurality of fourth signal lines is at least partially located in the rounded corner region; each of the plurality of straight edge gate driving structures includes a third output end, and each of the plurality of rounded corner gate driving structures includes a fourth output end, a plurality of third output ends of the plurality of straight edge gate driving structures are connected to the plurality of third signal lines through a plurality of third connection structures, and a plurality of fourth output ends of the plurality of rounded corner gate driving structures are connected to the plurality of fourth signal lines through a plurality of fourth connection structures; each of the plurality of third connection structures includes a third conductive part and a plurality of via connection structures, each of the plurality of fourth connection structures includes a fourth conductive part and a plurality of via connection structures, the third conductive part and the fourth conductive part are located in a same conductive layer, and a number and a type of the plurality of via connection structures in each of the plurality of third connection structures are the same as a number and a type of the plurality of via connection structures in each of the plurality of fourth connection structures.

For example, in the display substrate provided by an embodiment of the present disclosure, the plurality of third signal lines and the plurality of fourth signal lines are configured to transmit a same type of second driving signals, and both the third output end and the fourth output end are configured to output the same type of second driving signals, the type of the first driving signals is different from the type of the second driving signals.

For example, in the display substrate provided by an embodiment of the present disclosure, the second driving signal includes one of a first gate driving signal, a second gate driving signal, and a light emission control signal.

For example, in the display substrate provided by an embodiment of the present disclosure, the first conductive part, the second conductive part, the third conductive part, and the fourth conductive part are all located in a same conductive layer.

For example, the display substrate provided by an embodiment of the present disclosure further includes: a plurality of fifth signal lines, located in the display area and extending in the first direction; a plurality of sixth signal lines, located in the display area and extending in the first direction; each of the plurality of fifth signal lines is at least partially located in the straight edge region, and each of the plurality of sixth signal lines is at least partially located in the rounded corner region; each of the plurality of straight edge gate driving structures includes a fifth output end, and each of the plurality of rounded corner gate driving structures includes a sixth output end, a plurality of fifth output ends of the plurality of straight edge gate driving structures are connected to the plurality of fifth signal lines through a plurality of fifth connection structures, and a plurality of sixth output ends of the plurality of rounded corner gate driving structures are connected to the plurality of sixth signal lines through a plurality of sixth connection structures; each of the plurality of fifth connection structures includes a fifth conductive part and a plurality of via connection structures, each of the plurality of sixth connection structures includes a sixth conductive part and a plurality of via connection structures, the fifth conductive part and the sixth conductive part are located in a same conductive layer, and a number and a type of the plurality of via connection structures in each of the plurality of fifth connection structures are the same as a number and a type of the plurality of via connection structures in each of the plurality of sixth connection structures.

For example, in the display substrate provided by an embodiment of the present disclosure, the plurality of fifth signal lines and the plurality of sixth signal lines are configured to transmit a same type of third driving signals, and both the fifth output end and the sixth output end are configured to output the same type of third driving signals, the type of the third driving signals is different from both the type of the first driving signals and the type of the second driving signals.

For example, in the display substrate provided by an embodiment of the present disclosure, the first conductive part, the second conductive part, the third conductive part, the fourth conductive part, the fifth conductive part, and the sixth conductive part are all located in a same conductive layer.

For example, in the display substrate provided by an embodiment of the present disclosure, the plurality of first connection structures, the plurality of third connection structures, and the plurality of fifth connection structures are sequentially arranged in the second direction, and the plurality of second connection structures, the plurality of fourth connection structures, and the plurality of sixth connection structures are sequentially arranged in the second direction, the first conductive part, the second conductive part, the third conductive part, and the fourth conductive part are located in a first conductive layer, the fifth conductive part and the sixth conductive part are located in a second conductive layer, and the first conductive layer is different from the second conductive layer.

For example, the display substrate provided by an embodiment of the present disclosure further includes: a plurality of seventh signal lines, located in the display area and extending in the first direction; a plurality of eighth signal lines, located in the display area and extending in the first direction; a plurality of cascaded lines, located in the peripheral area and extending in the first direction; each of the plurality of seventh signal lines is at least partially located in the straight edge region, and each of the plurality of eighth signal lines is at least partially located in the rounded corner region; the plurality of cascaded lines are connected to the plurality of seventh signal lines through a plurality of seventh connection structures, and the plurality of cascaded lines are connected to the plurality of eighth signal lines through a plurality of eighth connection structures; each of the plurality of seventh connection structures includes a seventh conductive part and a plurality of via connection structures, each of the plurality of eighth connection structures includes an eighth conductive part and a plurality of via connection structures, the seventh conductive part and the eighth conductive part are located in a same conductive layer, and a number and a type of the plurality of via connection structures in each of the plurality of seventh connection structures are the same as a number and a type of the plurality of via connection structures in each of the plurality of eighth connection structures.

For example, in the display substrate provided by an embodiment of the present disclosure, the plurality of seventh signal lines and the plurality of eighth signal lines are configured to transmit reset signals.

For example, in the display substrate provided by an embodiment of the present disclosure, the first conductive part, the second conductive part, the third conductive part, the fourth conductive part, the fifth conductive part, the sixth conductive part, the seventh conductive part, and the eighth conductive part are all located in a same conductive layer.

For example, in the display substrate provided by an embodiment of the present disclosure, the plurality of first connection structures, the plurality of seventh connection structures, the plurality of third connection structures, and the plurality of fifth connection structures are sequentially arranged in the second direction, and the plurality of second connection structures, the plurality of eighth connection structures, the plurality of fourth connection structures, and the plurality of sixth connection structures are sequentially arranged in the second direction, the first conductive part, the second conductive part, the third conductive part, and the fourth conductive part are located in a first conductive layer, the fifth conductive part and the sixth conductive part, the seventh conductive part and the eighth conductive part are located in a second conductive layer, and the first conductive layer is different from the second conductive layer.

For example, the display substrate provided by an embodiment of the present disclosure further includes: a first gate layer; a second gate layer, located on a side of the first gate layer away from the base substrate; a first source-drain metal layer, located on a side of the second gate layer away from the first gate layer; and a second source-drain metal layer, located on a side of the first source-drain metal layer away from the second gate layer, the plurality of first signal lines and the plurality of second signal lines are located in the first gate layer or the second gate layer, the first output end and the second output end are located in the first source-drain metal layer, and the first conductive part and the second conductive part are located in the second source-drain metal layer.

For example, the display substrate provided by an embodiment of the present disclosure further includes: a third gate layer, located between the second gate layer and the first source-drain metal layer, the plurality of first signal lines and the plurality of second signal lines are located in the first gate layer, or the plurality of first signal lines and the plurality of second signal lines are located in the second gate layer and the third gate layer.

For example, in the display substrate provided by an embodiment of the present disclosure, the straight edge region includes a display pixel structure and a dummy pixel structure, the dummy pixel structure is located on a side of the display pixel structure close to the peripheral area, and the rounded corner region does not include the dummy pixel structure.

At least one embodiment of the present disclosure further provides a display device, which includes any one of the above display substrates.

BRIEF DESCRIPTION OF DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed as any limitation to the present disclosure.

DETAILED DESCRIPTION

Figure 1:
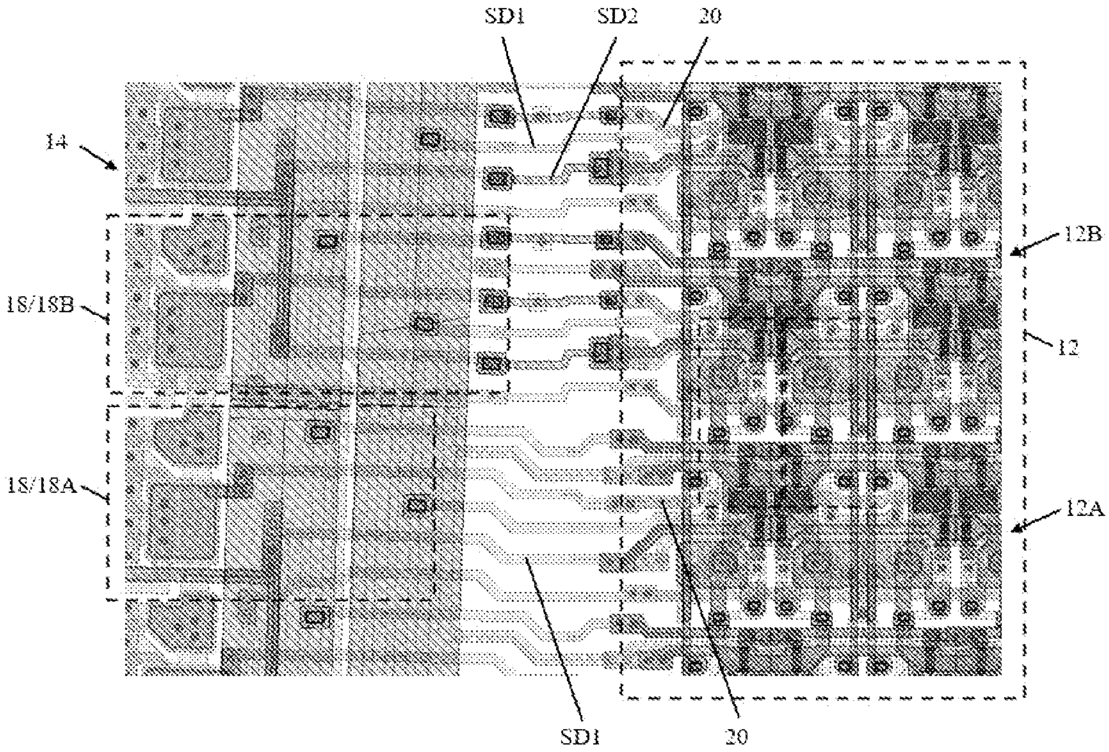
FIG. 1 is a partial planar schematic diagram of a display substrate provided by the present disclosure.

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Unless otherwise defined, the features such as "parallel", "vertical", and "identical" used in the embodiment of the present disclosure all include strictly defined situations such as "parallel", "vertical", and "identical", as well as situations where "substantially parallel", "substantially vertical", and "substantially identical" contain certain errors. For example, the above "substantially" can indicate that the difference between the compared objects is 10% of the average value of the compared objects, or within 5%. In a case that the number of a component or an element is not specifically specified in the following embodiments of the present disclosure, it means that the component or the element can be one or multiple, or can be understood as at least one. "At least one" refers to one or more, and "a plurality of" refers to at least two.

Due to advantages of low temperature polycrystalline oxide (LTPO) technology such as high charge mobility, high pixel response speed, and low power consumption, the LTPO technology is also increasingly used in display panels. LTPO display products have many requirements for performance specification, and these requirements for performance specification are closely related to the circuit design of backplate of the product.

The inventor(s) of the present application noticed that a common display substrate includes a rounded corner region and a straight edge region. Due to different spaces of the rounded corner region and the straight edge region, it is easy to cause differences or delays in signal lines that transmit driving signals between the rounded corner region and the straight edge region, which results in abnormal display.

FIG. 1 is a partial planar schematic diagram of a display substrate provided by the present disclosure. As illustrated by FIG. 1, the display substrate includes a display area 12 and a peripheral area 14; the display area 12 includes a straight edge region 12A and a rounded corner region 12B; the display area 12 is provided with a pixel structure P and a first gate line 20, a second gate line 30 and a light emission control line 40 that provide driving signals for the pixel structure P; the peripheral area 14 is provided with a plurality of gate driving structures 18, and the plurality of gate driving structures 18 include a straight edge gate driving structure 18A and a rounded corner gate driving structure 18B.

As illustrated by FIG. 1, in the rounded corner region 12B, the rounded corner gate driving structure 18B is connected with signal lines in the display area 12 through a conductive part located in a first source-drain metal layer SD1 and a conductive part located in a second source-drain metal layer SD2 respectively; in the straight edge region 12A, the straight edge gate driving structure 18A is connected with signal lines in the display area 12 through the conductive part located in the first source-drain metal layer SD1 and a conductive part located in a third gate electrode layer Gate3 respectively.

As illustrated by FIG. 1, taking the first gate driving signal as an example, the rounded corner gate driving structure 18B is connected with the first gate line 20 in the display area 12 through the conductive part located in the second source-drain metal layer SD2; one end of the conductive part is connected with a connection block located at SD1 through a via hole that passes through a planarization layer and a passivation layer, and then is connected with the first gate line 20 through a via hole penetrating an interlayer insulating layer, the other end of the conductive part is connected with an output end of the rounded corner gate driving structure 18B through a via hole that passes through the planarization layer and the passivation layer; the straight edge gate driving structure 18A is connected with the first gate line 20 in the display area 12 through the conductive part located in the first source-drain metal layer SD1; one end of the conductive part is connected with the first gate line 20 through a via hole penetrating the interlayer insulating layer, and the other end of the conductive part is directly connected with the output end of the rounded corner gate driving structure 18B. It can be seen that, compared with the rounded corner region, a connection structure for connecting the straight edge gate driving structure and the first gate line in the straight edge region lacks two via holes penetrating the planarization layer and the passivation layer; because overlapping resistance will be generated by the via hole switching connection, electrical properties of the conductive path used to transmit the first gate driving signal will be different in the straight edge region and the rounded corner region, so that first gate driving signals in the straight edge region and the rounded corner region generate a loading difference, the difference will be coupled to an N1 node in the pixel driving circuit through signal jump rising and falling as well as related parasitic capacitance, causing display abnormalities such as a split-screen display.

In this regard, embodiments of the present disclosure provide a display substrate and a display device. The display substrate includes a base substrate, a plurality of first signal lines, a plurality of second signal lines and a plurality of gate driving structures; the base substrate includes a display area and a peripheral area located around the display area; the plurality of first signal lines are located in the display area and extend along a first direction; the plurality of second signal lines are located in the display area and extend along the first direction; the plurality of gate driving structures are located in the peripheral area and arranged along a second direction intersecting the first direction. The display area includes a straight edge region and a rounded corner region, and the rounded corner region is located on a side of the straight edge region in the second direction, each of the plurality of first signal lines is at least partially located in the straight edge region, and each of the plurality of second signal lines is at least partially located in the rounded corner region; the plurality of gate driving structures include a plurality of straight edge gate driving structures and a plurality of rounded corner gate driving structures, each of the plurality of straight edge gate driving structures includes a first output end, and each of the plurality of rounded corner gate driving structures includes a second output end; the plurality of first output ends of the plurality of straight edge gate driving structures are connected with the plurality of first signal lines through a plurality of first connection structures, the plurality of second output ends of the plurality of rounded corner gate driving structures are connected with the plurality of second signal lines through a plurality of second connection structures; each of the plurality of first connection structures includes a first conductive part and a plurality of via hole connection structures, each of the plurality of second connection structure includes a second conductive part and a plurality of via hole connection structures, the first conductive part and the second conductive part are located in a same conductive layer, a number and a type of the plurality of via hole connection structures in each of the plurality of first connection structures are the same as a number and a type of the plurality of via hole connection structures in each of the plurality of second connection structures. In this way, by making the number and the type of the plurality of via hole connection structures in each of the plurality of first connection structures the same as the number and the type of the plurality of via hole connection structures in each of the plurality of second connection structures, the display substrate can effectively reduce difference between the electrical properties of the plurality of first connection structures and the electrical properties of the plurality of second connection structures, thus the risk of abnormal display on the display substrate is effectively reduced.

Hereinafter, the display substrate and the display device provided by the embodiments of the present disclosure will be described in detail with reference to the accompanying drawings.

Figure 2:
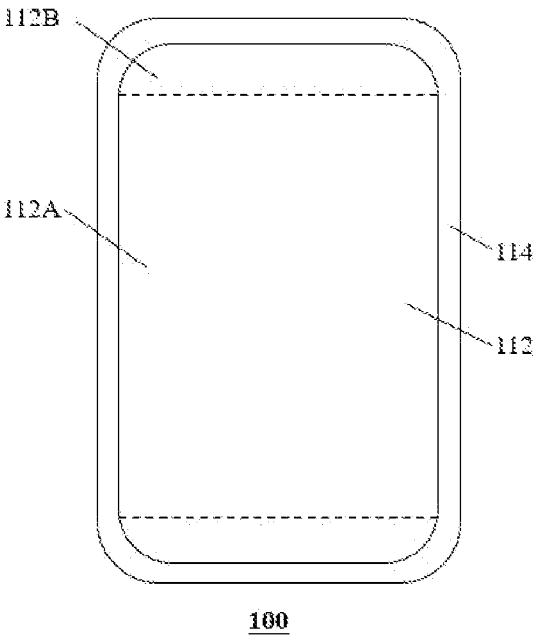
FIG. 2 is a planar schematic diagram of a display substrate provided by an embodiment of the present disclosure.
Figure 3A:
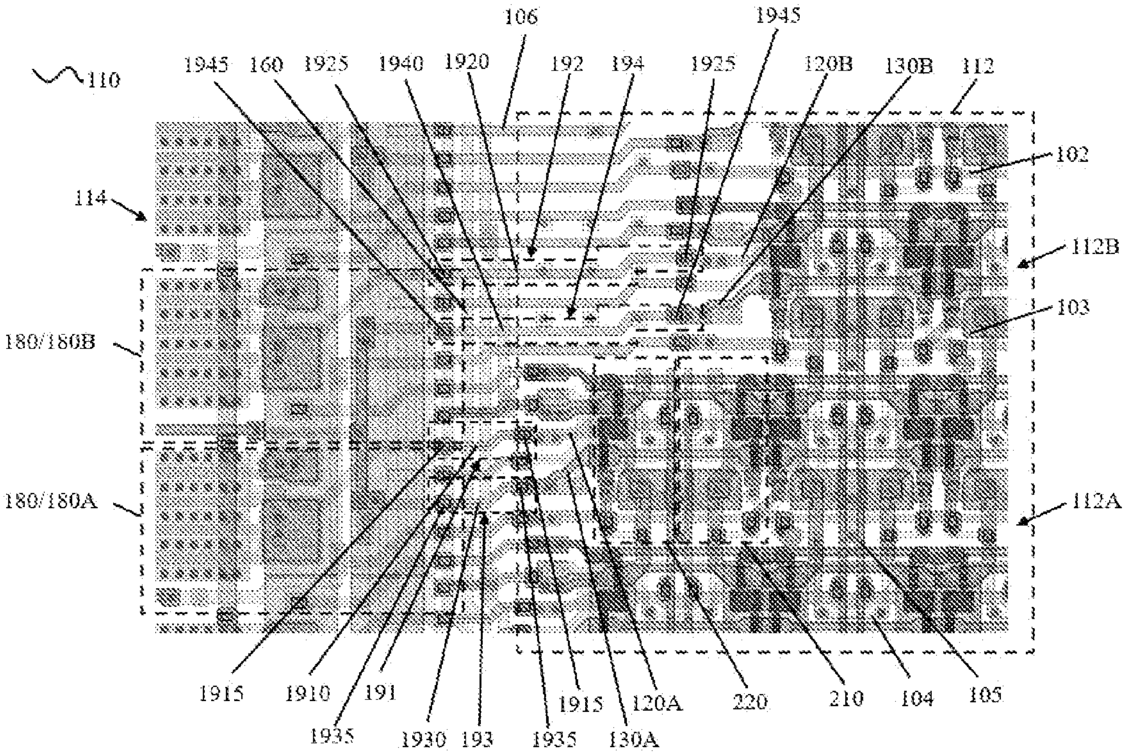
FIG. 3A and FIG. 3B respectively show partial planar schematic diagrams of the display substrate shown in FIG. 2.
Figure 3B:
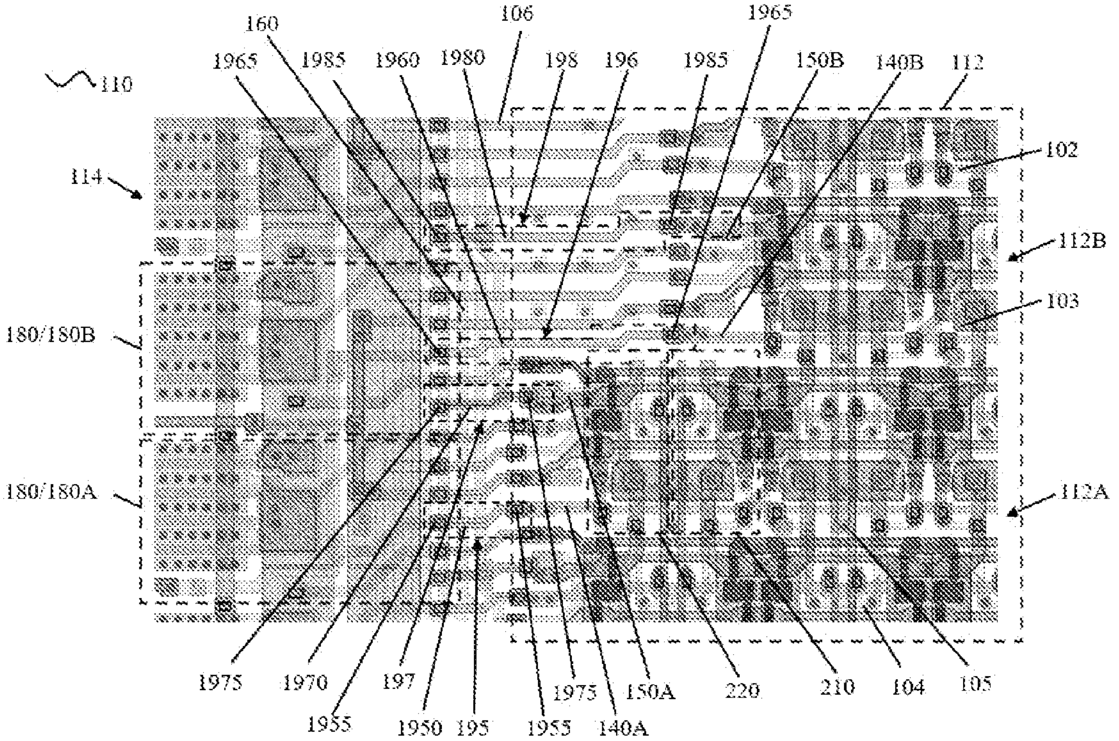

An embodiment of the present disclosure provides a display substrate. FIG. 2 is a planar schematic diagram of a display substrate provided by an embodiment of the present disclosure; FIG. 3A and FIG. 3B respectively show the partial planar schematic diagrams of the display substrate shown in FIG. 2. It should be noted that FIG. 3A and FIG. 3B show partial planar schematic diagrams of a same display substrate, in order to more clearly illustrate connection conditions of different signal lines, FIG. 3A and FIG. 3B respectively show reference numbers of different signal lines.

As illustrated by FIG. 2, FIG. 3A and FIG. 3B, the display substrate 100 includes a base substrate 110, a plurality of first signal lines 120A, a plurality of second signal lines 120B and a plurality of gate driving structures 180; the base substrate 110 includes a display area 112 and a peripheral area 114 located around the display area 112; the plurality of first signal lines 120A are located in the display area 112 and extend along the first direction; the plurality of second signal lines 120B are located in the display area 112 and extend along the first direction; the plurality of gate driving structures 180 are located in the peripheral area 114 and arranged along a second direction intersecting the first direction. It should be noted that the above-mentioned first signal lines and second signal lines may be signal lines that provide gate driving signals to pixels, such as gate lines, reset lines and light emission control lines; in addition, the first direction and the second direction may be perpendicular to each other.

As illustrated by FIG. 2, FIG. 3A and FIG. 3B, the display area 112 includes a straight edge region 112A and a rounded corner region 112B. The rounded corner region 112B is located on a side of the straight edge region 112A in the second direction, each of the first signal lines 120A is at least partially located in the straight edge region 112A, and each of the second signal lines 120B is at least partially located in the round corner region 112B. That is to say, the first signal lines 120A pass through the straight edge region 112A, and can provide driving signals for the pixels in the straight edge region 112A; the second signal lines 120B pass through the rounded corner region 112B, and may provide driving signals to the pixels in the rounded corner region 112B.

As illustrated by FIG. 3A, the plurality of gate driving structures 180 include a plurality of straight edge gate driving structures 180A and a plurality of rounded corner gate driving structures 180B. Each of the plurality of straight edge gate driving structures 180A includes a first output end 181, and each of the plurality of rounded corner gate driving structures 180B includes a second output end 182; the plurality of first output ends 181 of the plurality of straight edge gate driving structures 180A are connected with the plurality of first signal lines 120A through a plurality of first connection structures 191, the plurality of second output ends 182 of the plurality of rounded corner gate driving structures 180B are connected with the plurality of second signal lines 120B through a plurality of second connection structures 192; each of the first connection structures 191 includes a first conductive part 1910 and a plurality of via hole connection structures 1915, each of the second connection structures 192 includes a second conductive part 1920 and a plurality of via hole connection structures 1925, the first conductive part 1910 and the second conductive part 1920 are located in a same conductive layer, a number and a type of the plurality of via hole connection structures 1915 in each of the plurality of first connection structures 191 are the same as a number and a type of the plurality of via hole connection structures 1925 in each of the plurality of second connection structures 192. It should be noted that the above-mentioned types of the via hole connection structures can be divided according to the number of film layers that the via hole connection structures penetrate; for example, the via hole connection structures that only penetrate the interlayer insulating layer may be a same type of via hole connection structures, and the via hole connection structures that penetrate the planarization layer and the passivation layer may be another type of via hole connection structures.

In the display substrate provided by the embodiment of the present disclosure, the plurality of first output ends of the plurality of straight edge gate driving structures are connected with the plurality of first signal lines through the plurality of first connection structures, thus driving signals output by the plurality of first output ends can be applied to the plurality of first signal lines respectively; the plurality of second output ends of the plurality of rounded corner gate driving structures are connected with the plurality of second signal lines through the plurality of second connection structures, thus the driving signals output by the plurality of first output ends are respectively applied to the plurality of first signal lines. By arranging the first conductive parts in the first connection structures and the second conductive parts in the second connection structures in a same conductive layer, and making the number and the type of the plurality of via hole connection structures in each of the plurality of first connection structures the same as the number and the type of the plurality of via hole connection structures in each of the plurality of second connection structures, the display substrate can effectively reduce the difference between the electrical properties of the plurality of first connection structures and the electrical properties of the plurality of second connection structures, thus the risk of abnormal display on the display substrate is effectively reduced. It should be noted that the above-mentioned abnormal display may be a split screen phenomenon between the rounded corner region and the straight edge region.

It is worth noting that the above gate driving structures can also be called as gate driving units or gate driving shift registers; a plurality of gate driving structures are cascaded with each other to form a gate driving circuit.

In some examples, as illustrated by FIG. 3A, the first signal lines and the second signal lines are configured to transmit a same type of first driving signals, both the first output ends and the second output ends are configured to output the same type of first driving signals. In this way, the display substrate can effectively reduce difference in electrical properties between the conductive paths through which the same type of driving signal passes in the straight edge region and the rounded corner region, thus the risk of abnormal display on the display substrate is effectively reduced.

In some examples, the first driving signals include one of a first gate driving signal, a second gate driving signal, and a light emission control signal.

In some examples, as illustrated by FIG. 3A, the first signal lines 120A and the second signal lines 120B are configured to transmit first gate driving signals. In this case, the first conductive parts 1910 of the first connection structures 191 are located in the second source-drain metal layer, one end of each of the first conductive parts 1910 is connected with the first output end 181 of each of the plurality of straight edge gate driving structures 180A through a via connection structure that passes through the planarization layer and the passivation layer, the other end of each of the plurality of first conductive parts 1910 is connected with a connection block located in the first source-drain metal layer through a via connection structure that passes through the planarization layer and the passivation layer, and then the connection block is connected to the first signal lines 120A through a via hole penetrating the interlayer insulating layer. Similarly, the second conductive parts 1920 of the second connection structures 192 are located in the second source-drain metal layer, one end of each of the plurality of second conductive parts 1920 is connected with the second output end 182 of each of the plurality of rounded corner gate driving structures 180B through a via connection structure that passes through the planarization layer and the passivation layer, the other end of each of the plurality of second conductive parts 1920 is connected with a connection block located in the first source-drain metal layer through a via connection structure penetrating the planarization layer and the passivation layer, and then the connection block is connected with one of the second signal lines 120 through a via hole penetrating the interlayer insulating layer. In this way, the display substrate can effectively reduce the difference between the electrical properties of the conductive path through which the first gate driving signal passes in the straight edge region and the round corner region, thus the risk of abnormal display on the display substrate is effectively reduced. Of course, the above structures are explained by taking the first signal lines and the second signal lines configured to transmit the first gate driving signals as an example, but the embodiments of the present disclosure include but are not limited thereto, the first signal lines and the second signal lines are also configured to transmit other types of driving signals.

In some examples, as illustrated by FIG. 3A, the display substrate 100 further includes a plurality of third signal lines 130A and a plurality of fourth signal lines 130B; the plurality of third signal lines 130A are located in the display area 112 and extend along the first direction; the plurality of fourth signal lines 130B are located in the display area 112 and extend along the first direction; each of the plurality of third signal lines 130A is at least partially located in the straight edge region 112A, each of the plurality of fourth signal lines 130B is at least partially located in the rounded corner region 112B; each of the straight edge gate driving structures 180A includes a third output end 183, each of the rounded corner gate driving structures 180B includes a fourth output end 184, the plurality of third output ends 183 of the plurality of straight edge gate driving structures 180A are connected with the plurality of third signal lines 130A through a plurality of third connection structures 193, the plurality of fourth output ends 184 of the plurality of rounded corner gate driving structures 180B are connected with the plurality of fourth signal lines 130B through a plurality of fourth connection structures 194; each of the plurality of third connection structures 193 includes a third conductive part 1930 and a plurality of via hole connection structures 1935, each of the plurality of fourth connection structures 194 includes a fourth conductive part 1940 and a plurality of via hole connection structures 1945, the third conductive parts 1930 and the fourth conductive parts 1940 are located in a same conductive layer, the number and the type of via hole connection structures 1935 in each of the plurality of third connection structures 193 are the same as the number and the type of via hole connection structures 1945 in each of the plurality of fourth connection structures 194.

In the display substrate provided in this example, the plurality of third output ends of the plurality of straight edge gate driving structures are connected with the plurality of third signal lines through the plurality of third connection structures, thus the driving signals output by the plurality of third output ends can be applied to the plurality of third signal lines respectively; the plurality of fourth output ends of the plurality of rounded corner gate driving structures are connected with the plurality of fourth signal lines through the plurality of fourth connection structures, thus the driving signals output by the plurality of fourth output ends can be respectively applied to the plurality of fourth signal lines. By arranging the third conductive part and the fourth conductive part in the same conductive layer, and setting the number and type of the plurality of via hole connection structures in of the plurality of third connection structures to be the same as the number and type of the plurality of via hole connection structures in each of the plurality of fourth connection structures, the display substrate can effectively reduce the difference between the electrical properties of the plurality of third connection structures and the electrical properties of the plurality of fourth connection structures, thus the risk of abnormal display on the display substrate is effectively reduced. It should be noted that the above-mentioned abnormal display may be a split screen phenomenon between the rounded corner region and the straight edge region.

In some examples, as illustrated by FIG. 3A, the plurality of third signal lines 130A and the plurality of fourth signal lines 130B are configured to transmit a same type of second driving signals, both the third output ends 183 and the fourth output ends 184 are configured to output a same type of second driving signals, the first driving signal and the second driving signal are of different types. In this way, the display substrate can reduce the difference between the electrical properties of the conductive paths passed by the two gate driving signals, thus the risk of abnormal display on the display substrate is further effectively reduced.

In some examples, the second driving signal includes one of the first gate driving signal, the second gate driving signal, and the light emission control signal. It should be noted that the above-mentioned gate driving signal may also be called a scanning signal.

For example, the first driving signal is a first gate driving signal, and the second driving signal is a second gate driving signal.

In some examples, as illustrated by FIG. 3A, the first conductive parts 1910, the second conductive parts 1920, the third conductive parts 1930 and the fourth conductive parts 1940 are all located in a same conductive layer. In this way, if a space is sufficient, the display substrate uses the same conductive layer to form the first conductive parts, the second conductive parts, the third conductive parts and the fourth conductive parts mentioned above.

Of course, embodiments of the present disclosure include but are not limited thereto, the first conductive parts and the second conductive parts may be located in one conductive layer, such as the second source-drain electrode layer, at the same time, the third conductive parts and the fourth conductive parts may be located in another conductive layer, for example, the first source-drain electrode layer.

In some examples, as illustrated by FIG. 3B, the display substrate 100 further includes a plurality of fifth signal lines 140A and a plurality of sixth signal lines 140B; the plurality of fifth signal lines 140A are located in the display area 112 and extend along the first direction; the plurality of sixth signal lines 140B are located in the display area 112 and extend along the first direction. For example, the first direction may be a row direction of the pixel array in the display substrate.

In some examples, as illustrated by FIG. 3B, each of the fifth signal lines 140A is at least partially located in the straight edge region 112A, each of the sixth signal lines 140B is at least partially located in the rounded corner region 112B; each of the straight edge gate driving structures 180A includes a fifth output end 185, each of the rounded corner gate driving structures 180B includes a sixth output end 186, the plurality of fifth output ends 185 of the plurality of straight edge gate driving structures 180A are connected with the plurality of fifth signal lines 140A through a plurality of fifth connection structures 195, thus the driving signals output by the fifth output ends 185 can be applied to the plurality of fifth signal lines 140A; the plurality of sixth output ends 186 of the plurality of rounded corner gate driving structures 180B are connected with the plurality of sixth signal lines 140B through a plurality of sixth connection structures 196, thus the driving signals output by the sixth output ends 186 can be applied to the plurality of sixth signal lines 140B. Each of the fifth connection structures 195 includes a fifth conductive part 1950 and a plurality of via hole connection structures 1955, each of the sixth connection structures 196 includes a sixth conductive part 1960 and a plurality of via hole connection structures 1965, the fifth conductive part 1950 and the sixth conductive part 1960 are located in a same conductive layer, and the number and the type of the plurality of via hole connection structures 1955 in each of the plurality of fifth connection structures 195 are the same as the number and the type of the plurality of via hole connection structures 1965 in each of the plurality of sixth connection structures 196.

In the display substrate provided in this example, by arranging the fifth conductive parts and the sixth conductive parts in a same conductive layer, and setting the number and the type of the plurality of via hole connection structures in each of the plurality of fifth connection structure to be the same as the number and the type of the plurality of via hole connection structures in each of the plurality of sixth connection structures, the display substrate can effectively reduce the difference between the electrical properties of the plurality of fifth connection structures and the electrical properties of the plurality of sixth connection structures, thus the risk of abnormal display on the display substrate is effectively reduced. It should be noted that the above-mentioned abnormal display may cause a split screen phenomenon between the rounded corner region and the straight edge region.

In some examples, the plurality of fifth signal lines 140A and the plurality of sixth signal lines 140B are configured to transmit the same type of third driving signals, the fifth output ends 185 and the sixth output ends 186 are all configured to output the same type of third driving signals, the third driving signal is different from the first driving signal and the second driving signal. In this way, the display substrate can reduce the difference between the electrical properties of the conductive paths passed by the three gate driving signals, thus the risk of abnormal display on the display substrate is further effectively reduced.

In some examples, the third driving signal includes one of a first gate driving signal, a second gate driving signal, and a light emission control signal. It should be noted that the above-mentioned gate driving signal may also be called a scanning signal.

For example, the first driving signal may be a first gate driving signal, the second driving signal may be a second gate driving signal, and the third driving signal may be a light emission control signal.

It is worth noting that the current gate driving structures generally only output the first gate driving signal, the second gate driving signal and the light emission control signal mentioned above; if the gate driving structures can also output other driving signals, then an output end, a signal line and a connection structure corresponding to the driving signal can be deduced by analogy with reference to the first output end, the second output end, the first signal line, the second signal line, the first connection structure and the second connection structure mentioned above, so that the difference between the electrical properties of the conductive paths passed by the driving signals is reduced, thus the risk of abnormal display on the display substrate is further effectively reduced.

In some examples, as illustrated by FIG. 3A and FIG. 3B, the first conductive parts 1910, the second conductive parts 1920, the third conductive parts 1930, the fourth conductive parts 1940, the fifth conductive parts 1950 and the sixth conductive parts 1960 are all in a same conductive layer. In this way, if the space is enough, the display substrate uses the same conductive layer to form the first conductive parts, the second conductive parts, the third conductive parts, the fourth conductive parts, the fifth conductive parts and the sixth conductive parts mentioned above.

In some examples, as illustrated by FIG. 3B, the display substrate 100 further includes a plurality of seventh signal lines 150A, a plurality of eighth signal lines 150B, and a plurality of cascade lines 160; the plurality of seventh signal lines 150A are located in the display area 112 and extend along the first direction; the plurality of eighth signal lines 150B are located in the display area 112 and extend along the first direction; the plurality of cascade lines 160 are located in the peripheral area 114 and extend along the first direction. It should be noted that the cascade line can be connected with an output end of a gate driving signal of an Nth gate driving structure before the gate driving structure corresponding to the current pixel row, thus to provide a reset signal for the current pixel row, the value of N can be determined according to the actual driving method, and the embodiments of the present disclosure are not limited herein.

In some examples, as illustrated by FIG. 3B, each of the seventh signal lines 150A is at least partially located in the straight edge region 112A, each of the eighth signal lines 150B is at least partially located in the rounded corner region 112B; the plurality of cascade lines 160 are connected with the plurality of seventh signal lines 150A through a plurality of seventh connection structures 197, thus driving signals on the plurality of cascade lines 160 can be applied to the plurality of seventh signal lines 150A; the plurality of cascade lines 160 are connected with the plurality of eighth signal lines 150B through a plurality of eighth connection structures 198, thus driving signals on the plurality of cascade lines 160 can be applied to the plurality of eighth signal lines 150B; each of the plurality of seventh connection structures 197 includes a seventh conductive part 1970 and a plurality of via hole connection structures 1975, each of the plurality of eighth connection structures 198 includes an eighth conductive part 1980 and a plurality of via hole connection structures 1985, the seventh conductive part 1970 and the eighth conductive part 1980 are located in a same conductive layer, the number and the type of the plurality of via hole connection structures 1975 in each of the plurality of seventh connection structures 197 are the same as the number and the type of the plurality of via hole connection structures 1985 in each of the plurality of eighth connection structures 198.

In the display substrate provided in this example, by arranging the seventh conductive parts and the eighth conductive parts in the same conductive layer, and setting the number and the type of the plurality of via hole connection structures in each of the plurality of seventh connection structures to be the same as the number and the type of the plurality of via hole connection structures in each of the plurality of eighth connection structures, the display substrate can effectively reduce the difference between the electrical properties of the seventh connection structure and the electrical properties of the eighth connection structure, thus the risk of abnormal display on the display substrate is effectively reduced. It should be noted that the above-mentioned abnormal display may be a split screen phenomenon between the rounded corner region and the straight edge region.

In some examples, the plurality of seventh signal lines 150A and the plurality of eighth signal lines 150B are configured to transmit reset signals. Of course, embodiments of the present disclosure include but are not limited thereto, the seventh signal lines and the eighth signal lines can also be used to transmit other cascaded signals.

In some examples, as illustrated by FIG. 3A and FIG. 3B, the first conductive parts 1910, the second conductive parts 1920, the third conductive parts 1930, the fourth conductive parts 1940, the fifth conductive parts 1950, the sixth conductive parts 1960, the seventh conductive parts 1970 and the eighth conductive parts 1980 are all located in the same conductive layer.

In some examples, as illustrated by FIG. 3A and FIG. 3B, the display substrate 100 further includes a first gate layer 102, a second gate layer 103, a first source-drain metal layer 105 and a second source-drain metal layer 106; the first gate layer 102 is located on the base substrate 110; the second gate layer 103 is located on a side of the first gate layer 102 away from the base substrate 110; the first source-drain metal layer 105 is located on a side of the second gate layer 103 away from the first gate layer 102; and the second source-drain metal layer 106 is located on a side of the first source-drain metal layer 105 away from the second gate layer 103.

In some examples, as illustrated by FIG. 3A and FIG. 3B, the first signal lines 120A and the second signal lines 120B are located in the first gate layer 102 or the second gate layer 103; the first output ends 181 and the second output ends 182 are located in the first source-drain metal layer 105, the first conductive parts 1910 and the second conductive parts 1920 are located in the second source-drain metal layer 106. Of course, embodiments of the present disclosure include but are not limited thereto, and the first conductive parts 1910 and the second conductive parts 1920 may also be located in the first source-drain metal layer 105.

In some examples, as illustrated by FIG. 3A and FIG. 3B, the display substrate 100 further includes a third gate layer 104; the third gate layer 104 is located between the second gate layer 103 and the first source-drain metal layer 105; the first signal lines 120A and the second signal lines 120B are located in the first gate layer 102, or the first signal lines 120A and the second signal lines 120B are located in the second gate layer 103 and the third gate layer 104. That is, the pixel driving circuits in the display area may include double-gate structure thin film transistors.

Figure 4:
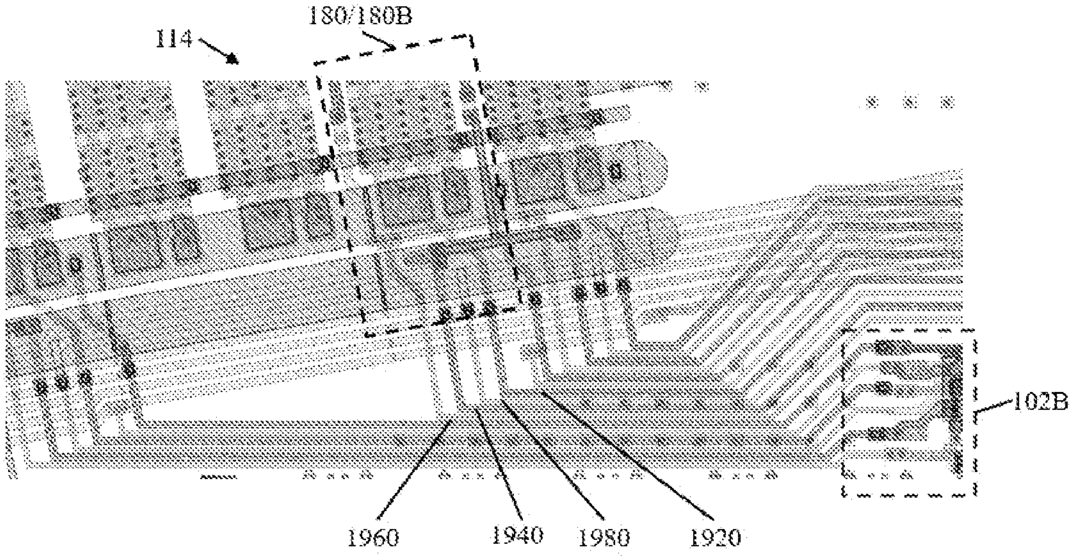
FIG. 4 is a partial planar schematic diagram of another display substrate provided by an embodiment of the present disclosure.

FIG. 4 is a partial planar schematic diagram of another display substrate provided by an embodiment of the present disclosure. As illustrated by FIG. 4, if the space outside the rounded corner region 112B is not enough for all the connection structures to use the same conductive layer to arrange the above-mentioned conductive parts, (for example, the above-mentioned second conductive parts, fourth conductive parts, sixth conductive parts, eighth conductive parts, etc.), in this case, the space can be increased by deleting dummy pixel structures in the rounded corner region 112B. It should be noted that, in the display field, a dummy pixel structure is usually set up outside the display pixel structure normally used for display to avoid the problem of poor edge technology.

In some examples, as illustrated by FIG. 4, the straight edge region 112A includes a display pixel structure 210 and a dummy pixel structure 220, the dummy pixel structure 220 is located on a side of the display pixel structure 210 close to the peripheral area 114, the rounded corner region 112B does not include dummy pixel structures, thus wiring space can be increased by omitting the dummy pixel structures. In addition, the above-mentioned dummy pixel structure can adopt the same structure as the display pixel structure, or can be only a part of the above-mentioned display pixel structure, such as half.

In some examples, as illustrated by FIG. 4, if the space outside the rounded corner region 112B is not enough for all the connection structures to use the same conductive layer to arrange the above-mentioned conductive parts, distance between adjacent conductive parts can also be reduced. For example, the distance between adjacent conductive parts is less than or equal to 2 microns, or even less than or equal to 1 micron.

In some examples, as illustrated by FIG. 4, if the space outside the rounded corner region 112B is not enough for all connection structures to use the same conductive layer to arrange the above-mentioned conductive parts, the second conductive parts 1920, the fourth conductive parts 1940, the sixth conductive parts 1960 and the eighth conductive parts 1980 may also be alternately used with different conductive layers to increase wiring density.

Figure 5:
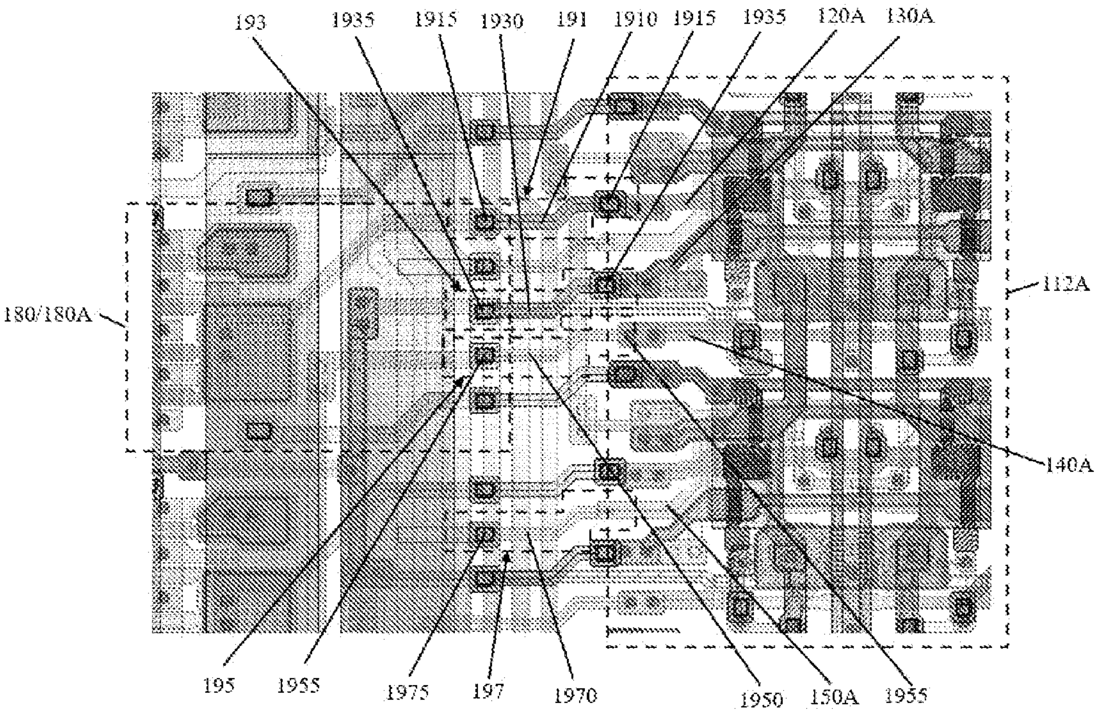
FIG. 5 is a partial planar schematic diagram of still another display substrate provided by an embodiment of the present disclosure.
Figure 6:
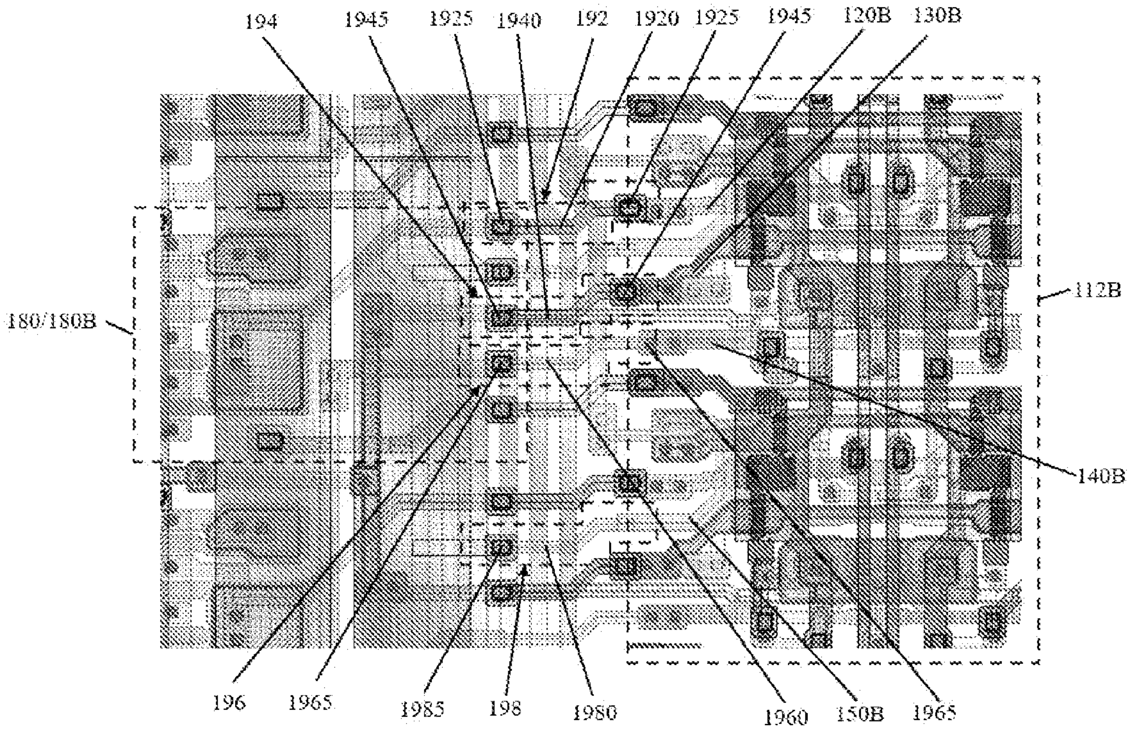
FIG. 6 is a partial planar schematic diagram of still another display substrate provided by an embodiment of the present disclosure.

FIG. 5 is a partial planar schematic diagram of still another display substrate provided by an embodiment of the present disclosure; and FIG. 6 is a partial planar schematic diagram of still another display substrate provided by an embodiment of the present disclosure.

In some examples, as illustrated by FIG. 5, the first output ends 181 of the straight edge gate driving structures 180A are connected with the plurality of first signal lines 120A through the first connection structures 191; each of the first connection structures 191 includes a first conductive part 1910 and a plurality of via hole connection structures 1915; the third output ends 183 of the straight edge gate driving structure 180A are connected with the third signal lines 130A through the third connection structures 193; each of the third connection structures 193 includes a third conductive part 1930 and a plurality of via hole connection structures 1935; the fifth output ends 185 of the straight edge gate driving structures 180A are connected with the fifth signal lines 140A through the fifth connection structures 195; each of the fifth connection structures 195 includes a fifth conductive part 1950 and a plurality of via hole connection structures 1955.

In some examples, as illustrated by FIG. 5, the first connection structures 191, the third connection structures 193 and the fifth connection structures 195 are arranged in sequence in the second direction, the first conductive parts 1910 and the third conductive parts 1930 are located in the first conductive layer, the fifth conductive layer 1950 is located in the second conductive layer; the first conductive layer and the second conductive layer are different. In this way, the display substrate can increase the wiring density.

In some examples, as illustrated by FIG. 5, the cascade lines 160 are connected with the seventh signal lines 150A through the seventh connection structures 197, each of the seventh connection structures 197 includes a seventh conductive part 1970 and a plurality of via hole connection structures 1975. The first connection structures 191, the seventh connection structures 197, the third connection structures 193 and the fifth connection structures 195 are arranged in sequence in the second direction, the first conductive parts 1910 and the third conductive parts 1930 are located in the first conductive layer, and the fifth conductive parts 1950 and the seventh conductive parts 1970 are located in the second conductive layer; the first conductive layer and the second conductive layer are different. In this way, the display substrate can increase the wiring density.

In some examples, as illustrated by FIG. 6, the second output ends 182 of the rounded corner gate driving structures 180B are connected with the plurality of second signal lines 120B through the second connection structures 192; each of the second connection structures 192 includes a second conductive part 1920 and a plurality of via hole connection structures 1925; the fourth output ends 184 of the rounded corner gate driving structures 180B are connected with the fourth signal lines 130B through the fourth connection structures 194; each of the fourth connection structures 194 includes a fourth conductive part 1940 and a plurality of via hole connection structures 1945; the sixth output ends 186 of the rounded corner gate driving structure 180B are connected with the sixth signal lines 140B through the sixth connection structures 196; and each of the sixth connection structures 196 includes a sixth conductive portion 1960 and a plurality of via hole connection structures 1965.

In some examples, as illustrated by FIG. 6, the second connection structures 192, the fourth connection structures 194 and the sixth connection structures 196 are arranged in sequence in the second direction, the second conductive parts 1920 and the fourth conductive parts 1940 are located in the first conductive layer, the sixth conductive layer 1960 is located in the second conductive layer; the first conductive layer and the second conductive layer are different. In this way, the display substrate can increase the wiring density.

In some examples, as illustrated by FIG. 6, the cascade lines 160 are connected with the eighth signal lines 150B through the eighth connection structures 198, each of the eighth connection structures 198 includes an eighth conductive part 1980 and a plurality of via hole connection structures 1985. The second connection structures 192, the eighth connection structures 198, the fourth connection structures 194 and the sixth connection structures 196 are arranged in sequence in the second direction, the second conductive parts 1920 and the fourth conductive parts 1940 are located in the first conductive layer, the sixth conductive part 1960 and the eighth conductive part 1980 are located in the second conductive layer; and the first conductive layer and the second conductive layer are different. In this way, the display substrate can increase the wiring density.

In some examples, as illustrated by FIGS. 5 and 6, the first connection structures 191, the third connection structures 193 and the fifth connection structures 195 are arranged sequentially in the second direction; the second connection structures 192, the fourth connection structures 194 and the sixth connection structures 196 are arranged in sequence in the second direction. The first conductive parts 1910, the third conductive parts 1930, the second conductive parts 1920 and the fourth conductive parts 1940 are located in the first conductive layer; the fifth conductive parts 1950 and the sixth conductive parts 1960 are located in the second conductive layer; and the first conductive layer and the second conductive layer are different. In this way, the display substrate can increase the wiring density.

In some examples, as illustrated by FIGS. 5 and 6, the first connection structures 191, the seventh connection structures 197, the third connection structures 193 and the fifth connection structures 195 are arranged in sequence in the second direction, the second connection structures 192, the eighth connection structures 198, the fourth connection structures 194 and the sixth connection structures 196 are arranged in sequence in the second direction; the first conductive parts 1910, the third conductive parts 1930, the second conductive parts 1920 and the fourth conductive parts 1940 are located in the first conductive layer, the fifth conductive parts 1950, the seventh conductive parts 1970, the sixth conductive parts 1960 and the eighth conductive parts 1980 are located in the second conductive layer; and the first conductive layer and the second conductive layer are different. In this way, the display substrate can increase the wiring density.

Figure 7:
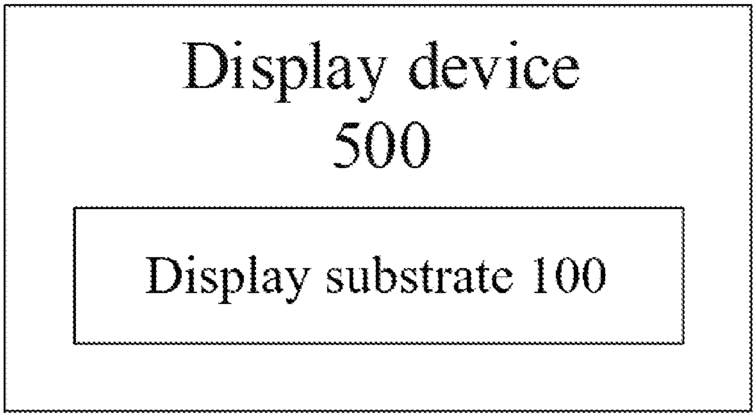
FIG. 7 is a schematic diagram of a display device provided by an embodiment of the present disclosure.

An embodiment of the present disclosure also provides a display device. FIG. 7 is a schematic diagram of a display device provided by an embodiment of the present disclosure. As illustrated by FIG. 7, the display device 500 includes the above-mentioned display substrate 100. In this way, the display device has technical effects corresponding to the beneficial technical effects of the liquid crystal display panel it includes.

For example, the display device may be a television, a monitor, an electronic picture frame, an electronic photo frame, a navigator, a notebook computer, a tablet computer, a smartphone, or other electronic products with display functions.

The following points need to be explained:

(1) The drawings of the embodiment of the present disclosure only relate to the structure related to the embodiment of the present disclosure, and other structures can refer to the general design.

(2) In the case of no conflict, the embodiments of the present disclosure and the features in the embodiments can be combined with each other to obtain a new embodiment.

The above is only the specific implementation of the present disclosure, but the scope of protection of the present disclosure is not limited thereto, and the scope of protection of the present disclosure should be subject to the scope of protection of the claims.

The invention claimed is:

1. A display substrate, comprising:

a base substrate, comprising a display area and a peripheral area located around the display area;

a plurality of first signal lines, located in the display area and extending in a first direction;

a plurality of second signal lines, located in the display area and extending in the first direction;

a plurality of gate driving structures, located in the peripheral area and arranged in a second direction intersecting with the first direction;

wherein the display area comprises a straight edge region and a rounded corner region, the rounded corner region is located on a side of the straight edge region in the second direction, each of the first signal lines is at least partially located in the straight edge region, and each of the second signal lines is at least partially located in the rounded corner region;

the plurality of gate driving structures comprise a plurality of straight edge gate driving structures and a plurality of rounded corner gate driving structures, each of the straight edge gate driving structures comprises a first output end, and each of the rounded corner gate driving structures comprises a second output end;

a plurality of first output ends of the plurality of straight edge gate driving structures are connected to the plurality of first signal lines through a plurality of first connection structures, and a plurality of second output ends of the plurality of rounded corner gate driving structures are connected to the plurality of second signal lines through a plurality of second connection structures;

each of the plurality of first connection structures comprises a first conductive part and a plurality of via connection structures, each of the plurality of second connection structures comprises a second conductive part and a plurality of via connection structures, the first conductive part and the second conductive part are located in a same conductive layer, and a number and a type of the plurality of via connection structures in each of the plurality of first connection structures are the same as a number and a type of the plurality of via connection structures in each of the plurality of second connection structures, the display substrate further comprises:

a first gate layer;

a second gate layer, located on a side of the first gate layer away from the base substrate;

a first source-drain metal layer, located on a side of the second gate layer away from the first gate layer; and a second source-drain metal layer, located on a side of the first source-drain metal layer away from the second gate layer, wherein the plurality of first signal lines and the plurality of second signal lines are located in the first gate layer or the second gate layer, the first output end and the second output end are located in the first source-drain metal layer, and the first conductive part and the second conductive part are located in the second source-drain metal layer.

2. The display substrate according to claim 1, wherein the plurality of first signal lines and the plurality of second signal lines are configured to transmit a same type of first driving signals, and both the first output end and the second output end are configured to output the same type of first driving signals.

3. The display substrate according to claim 2, wherein the first driving signal comprises one of a first gate driving signal, a second gate driving signal, and a light emission control signal.

4. The display substrate according to claim 1, further comprising:

a plurality of third signal lines, located in the display area and extending in the first direction;

a plurality of fourth signal lines, located in the display area and extending in the first direction;

wherein each of the plurality of third signal lines is at least partially located in the straight edge region, and each of the plurality of fourth signal lines is at least partially located in the rounded corner region;

each of the plurality of straight edge gate driving structures comprises a third output end, and each of the plurality of rounded corner gate driving structures comprises a fourth output end, a plurality of third output ends of the plurality of straight edge gate driving structures are connected to the plurality of third signal lines through a plurality of third connection structures, and a plurality of fourth output ends of the plurality of rounded corner gate driving structures are connected to the plurality of fourth signal lines through a plurality of fourth connection structures;

each of the plurality of third connection structures comprises a third conductive part and a plurality of via connection structures, each of the plurality of fourth connection structures comprises a fourth conductive part and a plurality of via connection structures, the third conductive part and the fourth conductive part are located in a same conductive layer, and a number and a type of the plurality of via connection structures in each of the plurality of third connection structures are the same as a number and a type of the plurality of via connection structures in each of the plurality of fourth connection structures.

5. The display substrate according to claim 4, wherein the plurality of third signal lines and the plurality of fourth signal lines are configured to transmit a same type of second driving signals, and both the third output end and the fourth output end are configured to output the same type of second driving signals, the type of the first driving signals is different from the type of the second driving signals.

6. The display substrate according to claim 5, wherein the second driving signal comprises one of a first gate driving signal, a second gate driving signal, and a light emission control signal.

7. The display substrate according to claim 5, further comprising:

a plurality of fifth signal lines, located in the display area and extending in the first direction;

a plurality of sixth signal lines, located in the display area and extending in the first direction;

wherein each of the plurality of fifth signal lines is at least partially located in the straight edge region, and each of the plurality of sixth signal lines is at least partially located in the rounded corner region;

each of the plurality of straight edge gate driving structures comprises a fifth output end, and each of the plurality of rounded corner gate driving structures comprises a sixth output end, a plurality of fifth output ends of the plurality of straight edge gate driving structures are connected to the plurality of fifth signal lines through a plurality of fifth connection structures, and a plurality of sixth output ends of the plurality of rounded corner gate driving structures are connected to the plurality of sixth signal lines through a plurality of sixth connection structures;

each of the plurality of fifth connection structures comprises a fifth conductive part and a plurality of via connection structures, each of the plurality of sixth connection structures comprises a sixth conductive part and a plurality of via connection structures, the fifth conductive part and the sixth conductive part are located in a same conductive layer, and a number and a type of the plurality of via connection structures in each of the plurality of fifth connection structures are the same as a number and a type of the plurality of via connection structures in each of the plurality of sixth connection structures.

8. The display substrate according to claim 7, wherein the plurality of fifth signal lines and the plurality of sixth signal lines are configured to transmit a same type of third driving signals, and both the fifth output end and the sixth output end are configured to output the same type of third driving signals, the type of the third driving signals is different from both the type of the first driving signals and the type of the second driving signals.

9. The display substrate according to claim 7, wherein the first conductive part, the second conductive part, the third conductive part, the fourth conductive part, the fifth conductive part, and the sixth conductive part are all located in a same conductive layer.

10. The display substrate according to claim 7, wherein the plurality of first connection structures, the plurality of third connection structures, and the plurality of fifth connection structures are sequentially arranged in the second direction, and the plurality of second connection structures, the plurality of fourth connection structures, and the plurality of sixth connection structures are sequentially arranged in the second direction, the first conductive part, the second conductive part, the third conductive part, and the fourth conductive part are located in a first conductive layer, the fifth conductive part and the sixth conductive part are located in a second conductive layer, and the first conductive layer is different from the second conductive layer.

11. The display substrate according to claim 7, further comprising:

a plurality of seventh signal lines, located in the display area and extending in the first direction;

a plurality of eighth signal lines, located in the display area and extending in the first direction;

a plurality of cascaded lines, located in the peripheral area and extending in the first direction;

wherein each of the plurality of seventh signal lines is at least partially located in the straight edge region, and each of the plurality of eighth signal lines is at least partially located in the rounded corner region;

the plurality of cascaded lines are connected to the plurality of seventh signal lines through a plurality of seventh connection structures, and the plurality of cascaded lines are connected to the plurality of eighth signal lines through a plurality of eighth connection structures;

each of the plurality of seventh connection structures comprises a seventh conductive part and a plurality of via connection structures, each of the plurality of eighth connection structures comprises an eighth conductive part and a plurality of via connection structures, the seventh conductive part and the eighth conductive part are located in a same conductive layer, and a number and a type of the plurality of via connection structures in each of the plurality of seventh connection structures are the same as a number and a type of the plurality of via connection structures in each of the plurality of eighth connection structures.

12. The display substrate according to claim 11, wherein the plurality of seventh signal lines and the plurality of eighth signal lines are configured to transmit reset signals.

13. The display substrate according to claim 11, wherein the first conductive part, the second conductive part, the third conductive part, the fourth conductive part, the fifth conductive part, the sixth conductive part, the seventh conductive part, and the eighth conductive part are all located in a same conductive layer.

14. The display substrate according to claim 11, wherein the plurality of first connection structures, the plurality of seventh connection structures, the plurality of third connection structures, and the plurality of fifth connection structures are sequentially arranged in the second direction, and the plurality of second connection structures, the plurality of eighth connection structures, the plurality of fourth connection structures, and the plurality of sixth connection structures are sequentially arranged in the second direction, the first conductive part, the second conductive part, the third conductive part, and the fourth conductive part are located in a first conductive layer, the fifth conductive part and the sixth conductive part, the seventh conductive part and the eighth conductive part are located in a second conductive layer, and the first conductive layer is different from the second conductive layer.

15. The display substrate according to claim 4, wherein the first conductive part, the second conductive part, the third conductive part, and the fourth conductive part are all located in a same conductive layer.

16. The display substrate according to claim 1, further comprising:

a third gate layer, located between the second gate layer and the first source-drain metal layer, wherein the plurality of first signal lines and the plurality of second signal lines are located in the first gate layer, or the plurality of first signal lines and the plurality of second signal lines are located in the second gate layer and the third gate layer.

17. The display substrate according to claim 1, wherein the straight edge region comprises a display pixel structure and a dummy pixel structure, the dummy pixel structure is located on a side of the display pixel structure close to the peripheral area, and the rounded corner region does not comprise the dummy pixel structure.

18. A display device, comprising a display substrate according to claim 1.

* * * * *